F. E. VAUGHAN.
SURVEYING INSTRUMENT.
APPLICATION FILED JAN. 11, 1921.

1,401,380. Patented Dec. 27, 1921.

INVENTOR
Francis E. Vaughan
BY
ATTORNEY

UNITED STATES PATENT OFFICE.

FRANCIS E. VAUGHAN, OF SALT LAKE CITY, UTAH.

SURVEYING INSTRUMENT.

1,401,380.    Specification of Letters Patent.    Patented Dec. 27, 1921.

Application filed January 11, 1921. Serial No. 436,563.

*To all whom it may concern:*

Be it known that I, FRANCIS E. VAUGHAN, a citizen of the United States, residing at Salt Lake City, in the county of Salt Lake and State of Utah, have invented certain new and useful Improvements in and Relating to Surveying Instruments, of which the following is a specification, reference being had therein to the accompanying drawing.

This invention relates to surveying instruments or the like, such as alidades, adapted for the measurement of vertical angles and the location and plotting of points.

The chief object of the invention is to provide an instrument of the character in question by means of which vertical angles can be measured more easily and in shorter time than by instruments heretofore used.

A further object of the invention is to provide an instrument of the character in question with a frame adapted to adequately support and protect the movable and adjustable parts of the instrument.

My improvements have been developed, and are especially advantageous, in connection with alidades used in plane table surveying and, for the purpose of explaining my invention, I will describe it as applied to a plane table alidade, referring to the accompanying drawing which shows a preferred form of construction.

Figure 1:
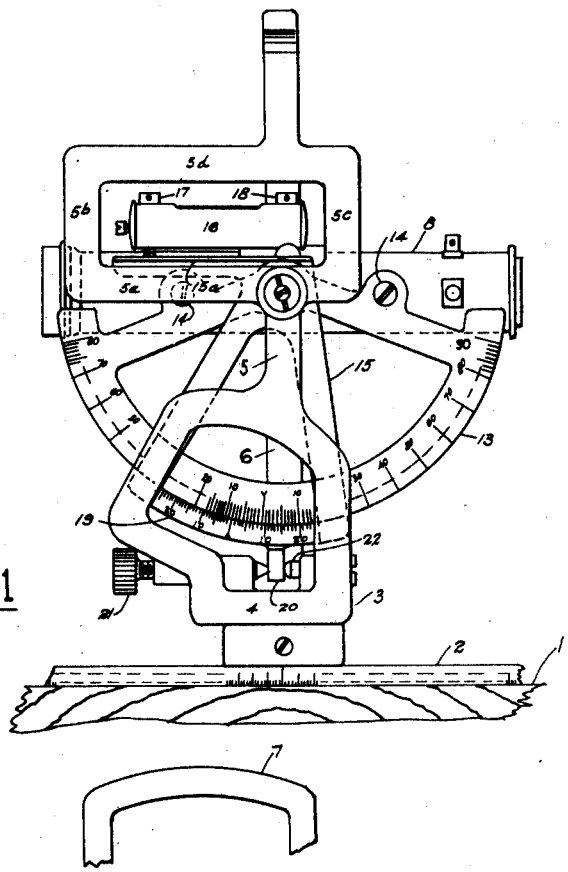

In the drawing, Figure 1 is a side elevation of my improved instrument.

Figure 2:
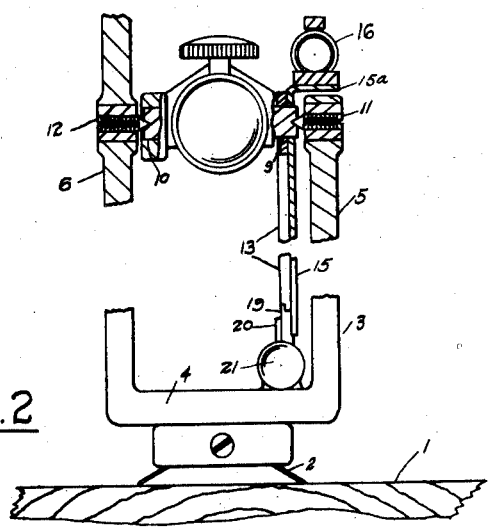

Fig. 2 is an end elevation of the same with some of the parts broken away and others shown in section for the purpose of more clearly showing the details of the construction.

Referring in detail to the construction shown, 1 is a portion of the top of a table which may be of any construction suitable for use in plane table surveying. 2 is a straight edge on which is mounted the main frame 3 of the instrument. As shown, this frame is an integral casting comprising a base 4, a pair of uprights 5 and 6 and a transverse member 7 connecting the uprights at their upper ends. 8 is a telescope provided with the usual cross hairs for sighting. The telescope is disposed between the uprights of the frame and carries trunnions 9 and 10 which are formed with conical bearings to receive pivot screws 11 and 12 adjustably mounted in the uprights 5 and 6. 13 is a graduated arc secured by screws 14, 14 to bosses formed on the tube of the telescope.

A support 15 is mounted at its upper end on the telescope trunnion 9 to swing on the pivotal axis of the telescope. This support is formed with a horizontal arm $15^a$ which carries a bubble tube 16, said tube being secured by screws 17 and 18 by means of which it can be adjusted in relation to the arm $15^a$ of the support. The lower part of the support 15 is bifurcated and carries at its lower end a vernier 19 disposed adjacent the graduated arc 13 to serve as an index in the reading of the latter. A depending lug 20 is secured to the vernier or to the support 15 in position to be engaged on one side by the end of an adjusting screw 21 and on the other side by a spring-pressed plunger 22. The upright 5 of the frame is bifurcated in the region of the vernier so that the latter can readily be seen and read. The said upright is also divided above the telescope bearing and formed with sections $5^a$, $5^b$, $5^c$ and $5^d$ which extend around and protect the bubble tube.

In preparing my improved alidade for use, the adjustments made are with one exception the same as those necessary with prior instruments. As is well known, prior instruments of this class are provided with a bubble tube adjustably mounted on the barrel of the telescope, and with a vernier for the graduated arc of the telescope, said vernier being mounted on the base of the frame, sometimes fixedly and sometimes adjustably. In the finest grade of alidades, provision is usually made for the following adjustments:

1. Focusing the eye-piece of the telescope on the cross hairs.

2. Centering the cross hairs with respect to the optical system and in such a way that the line of collimation describes a plane, rather than a cone, as the telescope is turned on its pivotal axis.

3. Making the pivotal axis of the telescope horizontal.

4. Adjusting the bubble tube.

Since the horizontal control by plane table methods is no more accurate than plotting on paper, certain of the above adjustments are eliminated in a number of makes of instruments; in other words, said adjustments are permanently made by the maker of the instrument. However, the leveling tube is so important that in all makes it is adjustable.

As the first three adjustments, whether made permanently by the maker or by the user of the instrument, are the same in my improved instrument as in the prior well known forms of alidades, the fourth adjustment alone need be described. To prepare my instrument for use, the bubble tube is adjusted by proceeding as follows:

With the instrument on the leveled table, first the line of collimation is brought to horizontal position in any well known or suitable manner, as by sighting at rods resting on two hubs of known elevation. Next the screw 21 is turned until the reading of the vernier on the graduated arc 13 is zero. Then the bubble is brought to the center of its tube by means of the adjusting screws 17 and 18.

The instrument is now ready for use. To measure vertical angles it is only necessary to sight the telescope at an object, whereupon the vertical angle between the line of sight and the horizontal can be read directly on the graduated arc. As the instrument is moved over the plane table, small irregularities may tilt the alidade slightly, but this can be compensated for by bringing the bubble back to center by simply turning the thumb screw 21. In other words, the procedure for measuring vertical angles with my instrument resolves itself to this: Sight the telescope at the object, turn the thumb screw until the bubble is centered, and read the angle directly.

The comparative ease and rapidity of this procedure will be appreciated by those familiar with the use of the prior instruments. With the latter, the procedure is as follows: The bubble tube having been adjusted by bringing the bubble to the center of its tube by adjusting the latter, vertical angles are measured by sighting the telescope on the object, reading the arc by means of the vernier, recording the reading, turning the telescope until the bubble is centered, again reading the arc and recording the reading. The difference between the two readings gives the value of the vertical angle between the horizontal plane and a line from the instrument to the object.

The above advantages of my improved form of instrument flow largely from the fact that the bubble tube and the vernier are mounted in definite relation to each other in such manner that their position is not affected by the movement of the telescope. Preferably, as in the construction illustrated, the bubble tube and the vernier are carried by a common support which is adjustable about the pivotal axis of the telescope.

Obviously, the frame of my instrument is designed so as to both secure adequate rigidity and provide protection for the various movable or adjustable parts.

While the construction illustrated and described is of a preferred form, it is to be understood that the foregoing disclosure is presented for purposes of explanation and that various changes can be made within the terms of the following claims which indicate the scope of the invention.

What I claim is:

1. In an instrument for measuring vertical angles, the combination of a frame, a bubble tube adjustably supported relative to the frame, a sighting device provided with a pair of sights and pivotally mounted on the frame to swing in an upright plane independently of the bubble tube, a graduated arc and a coöperating index, the one being mounted to swing with the sighting device and the other being rigidly connected to and movable with the bubble tube.

2. In an instrument for measuring vertical angles, the combination of a frame, a bubble tube, a support for the bubble tube carried by the frame, means for adjusting the bubble tube on its support, a sighting device provided with a pair of sights and pivotally mounted on the frame to swing in an upright plane independently of the bubble tube, a graduated arc and a coöperating index, the one being mounted to swing with the sighting device and the other being carried by the said support, and means for adjusting said support.

3. In an instrument for measuring vertical angles, the combination of a frame, a sighting device provided with a pair of sights and pivotally mounted on the frame to swing in an upright plane, a graduated arc carried by the sighting device, a vernier for said arc adjustably mounted to swing independently of the sighting device about the pivotal axis of said device, and a bubble tube mounted to move with the vernier.

4. In an instrument for measuring vertical angles, the combination of a frame, a sighting device provided with a pair of sights and pivotally mounted on the frame to swing in an upright plane, a graduated arc carried by the sighting device, a vernier for said arc adjustably mounted to swing independently of the sighting device about the pivotal axis of said device, a bubble tube mounted to move with the vernier, and means on the frame for adjusting the vernier.

5. In an instrument for measuring vertical angles, the combination of a frame, a sighting device provided with a pair of sights and pivotally mounted on the frame to swing in an upright plane, a graduated arc carried by the sightly device, a vernier for said arc adjustably mounted to swing independently of the sighting device about the pivotal axis of said device, a bubble tube mounted to move with the vernier, and means for adjusting the bubble tube relative to the vernier.

6. In an instrument for measuring vertical angles, the combination of a frame, a sighting device provided with a pair of sights and pivotally mounted on the frame to swing in an upright plane, a graduated arc carried by the sighting device, a vernier for said arc adjustably mounted to swing independently of the sighting device about the pivotal axis of said device, a bubble tube mounted to move with the vernier, and means on the frame for adjusting the vernier.

7. In an instrument for measuring vertical angles, the combination of a frame, a sighting telescope pivotally mounted on the frame to swing in an upright plane, a graduated arc carried by the telescope, a bubble tube, a support for said bubble tube normally stationary relative to the frame but adjustably mounted to swing about the pivotal axis of the telescope, means for adjusting the bubble tube relative to its support, a vernier carried by the said support to coöperate with the graduated arc, and means for angularly adjusting said support.

8. In an alidade for plane table surveying, the combination of a graduated straight edge, a frame mounted on said straight edge, a sighting device provided with a pair of sights and pivotally mounted on the frame to swing in an upright plane parallel to the straight edge, a bubble tube, a support for said bubble tube normally stationary relative to the frame but adjustably mounted to swing about the pivotal axis of said device, a graduated arc and a coöperating index, the one being mounted to swing with the sighting device and the other being fixed to the bubble tube support.

9. In an alidade for plane table surveying the combination of a graduated straight edge, a frame mounted on said straight edge, a sighting telescope pivotally mounted on the frame to swing in an upright plane parallel to the straight edge, a graduated arc carried by the telescope, a bubble tube, a support for said bubble tube normally stationary relative to the frame but adjustably mounted to swing about the pivotal axis of said telescope, means for adjusting the bubble tube relative to its support, a vernier carried by said support to coöperate with the graduated arc, and means for angularly adjusting said support.

10. In an instrument for measuring vertical angles, the combination of a frame, comprising a base and a pair of uprights and a transverse part connecting the said uprights at their upper ends, a sighting telescope disposed between the uprights and pivotally supported therein, a graduated arc carried by the telescope and extending downward therefrom, a bubble tube and vernier support disposed between the frame uprights at one side of the telescope and adjustably mounted to swing about the pivotal axis of the telescope, a vernier mounted on the support adjacent the graduated arc, a bubble tube on the support, means for adjusting the bubble tube relative to the support, and means for adjusting the support relative to the frame, said frame having parts surrounding the bubble tube to afford protection thereto.

In testimony whereof, I hereunto affix my signature.

FRANCIS E. VAUGHAN.